Feb. 15, 1966 L. PÉRAS 3,235,037
FRICTION-PLATES FOR DISC-BRAKES
Filed May 1, 1964 2 Sheets-Sheet 1

Inventor
Lucien Péras
By Stevens, Davis, Miller & Mosher
Attorneys

Feb. 15, 1966  L. PÉRAS  3,235,037
FRICTION-PLATES FOR DISC-BRAKES
Filed May 1, 1964  2 Sheets-Sheet 2

Inventor
Lucien Péras
By Stevens, Davis, Miller & Mosher
Attorneys

United States Patent Office 3,235,037
Patented Feb. 15, 1966

3,235,037
FRICTION-PLATES FOR DISC-BRAKES
Lucien Péras, Billancourt, France, assignor to Regie Nationale des Usines Renault, Billancourt, France
Filed May 1, 1964, Ser. No. 364,250
Claims priority, application France, May 10, 1963, 934,481, Patent 1,364,161; May 25, 1963, 936,016, Patent 83,817
3 Claims. (Cl. 188—250)

In the case of disc-brakes, the friction-plates are constituted by a metal armature on which is deposited, by moulding, a sintered material which is intended to apply the braking effort on the disc, and in consequence on the wheel.

In a friction-plate of this kind, the sintered material generally covers one face of the said armature in order to cooperate with the disc, and also overlaps the armature on the side, especially in a portion of the plate intended to cooperate with a stop member during braking, and the actual plates provided at the present time are subject to premature destruction in this zone by a splitting effect which will be explained later.

The invention is directed to the elimination of this drawback and to the best use of the friction material fixed on the armature, and it is essentially characterized in that the part of the armature which supports the friction material intended to cooperate with the said stop member is inclined with respect to the supporting face of the plate with the disc, towards the rear of this latter. The angle of inclination of the said inclined portion is preferably not very different from the angle whose cotangent is equal to the coefficient of friction between the friction material and the disc.

Two forms of embodiment of the invention are described below by way of example, reference being made to the accompanying drawings, in which.

Figure 1:
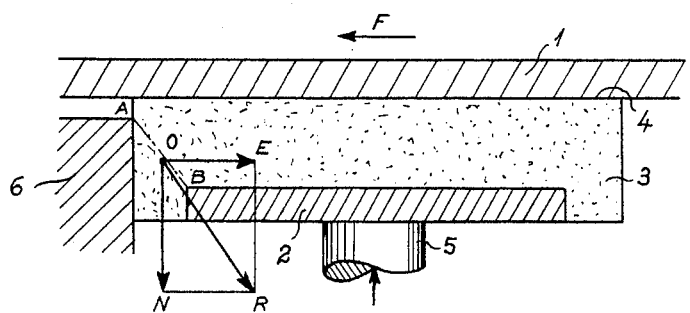
FIG. 1 is a view in central section of a conventional friction-plate cooperating with a disc-brake, the section being taken perpendicular to the axial plane of the disc passing through the center of the plate.

The conventional friction-plate, shown in FIG. 1 as cooperating with a disc-brake 1, comprises an armature 2 covered on one face and at the side by a sintered material 3, the supporting face 4 of which, intended to cooperate with the disc during braking, can be applied thereto by the action of a piston 5 forming part of a hydraulic operating device (not shown).

Under the effect of the pressure applied by the piston 5 of the hydraulic device forcing the face 4 of the sintered material against the disc 1, this material tends to be carried away in the direction of rotation of the disc, in this case indicated by the arrow F, and there is provided in all brakes of the kind considered, a stop member shown diagrammatically at 6, against which the sintered material 3 becomes blocked after a small travel corresponding to the normal play.

When the forces acting on this sintered material are examined, it is found that they consist mainly of a reaction to the driving force which is perpendicular to the contact face of the stop 6 and substantially located at its center, and of a reaction of the disc 1 on the sintered material, which reaction is perpendicular to the disc and can be divided up into a certain number of parallel forces such as N localized at O, to which corresponds the reaction E to the driving force. The forces E and N thus combine to form a resultant R which tends to cut the sintered material along the cleavage plane AB. It is found that the right angle of the armature of the plate, located at B, acts as a chisel under this separation force, even when the angle is rounded, for example when the armature is formed by a pressing.

Figure 2:
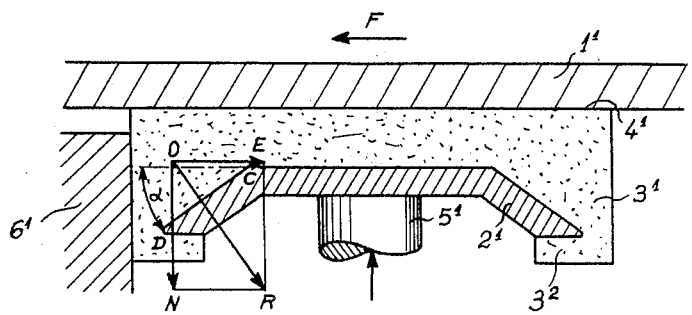
FIG. 2 is a view in a similar section of a friction plate according to the invention, cooperating with a disc-brake.

As shown in FIG. 2, in which the parts corresponding to those of FIG. 1 have been given the same reference numbers with the index 1, the construction according to the invention improves the properties of resistance to shear of the plate by giving the armature $2^1$ at CD a certain inclination with respect to the supporting face $4^1$ of the plate, towards the rear of this latter.

In this case, it is desirable that the inclination of the plane CD should be normal to the resultant R, so as to prevent any sliding and splitting action.

Now, the driving force corresponding to E depends on the pressure applied and thus on the reaction N, this driving force being equal to N multiplied by the coefficient of friction of the material in contact. It will therefore be preferable to adopt an inclination $\alpha$ equal to the angle whose cotangent is equal to the coefficient of friction between of the two materials under the conditions of use, which means that this inclination can vary between 10° and 40°, depending on the materials employed, and will generally be not very different from 20°.

This new shape given to the armature of the plate gives surprising results as regards resistance to cleavage. It is of course understood that this shape is applicable to any plate irrespective of its contour, in particular rectangular or curvilinear.

As the destruction of the conventional plates by shear or crushing of the edges generally occurs before the plates are scraped on reaching the limits of wear, the construction according to the invention makes its possible to obtain friction plates having longer life while at the same time reducing the wearing thickness, as will be clear from a comparison of FIGS. 1 and 2, and at the same time having the certainty that the extremities will not be crushed.

In addition, the adhesion of the sintered material to the armature can be still further increased by embedding this armature in the sintered material as shown in FIG. 2, in which the extensions $3^2$ of the sintered material are obtained by moulding.

In consequence, the total thickness of the plate may be equal to or very little different from that which is normally used, and the overall size of the brake operating device is not thereby modified.

It is furthermore acceptable to form at least one chamfered or rounded portion such as shown at the edge D of the armature. In this respect, an additional advantageous arrangement directed particularly to a better performance of the friction material is illustrated in FIG. 3.

Figure 3:
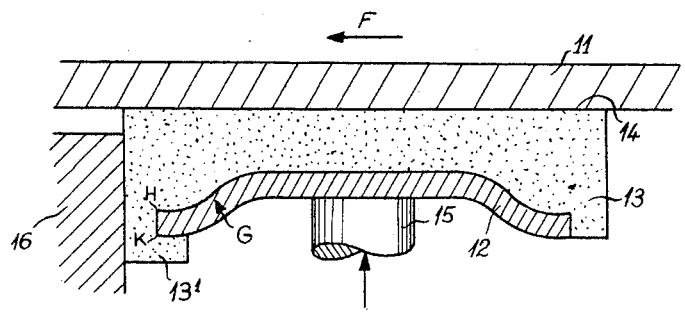
FIG. 3 is a view in central cross-section of another friction plate cooperating with a disc-brake, the section being taken perpendicular to the axial plane of the disc passing through the center of the plate.

In this FIG. 3, the friction-plate shown as cooperating with a brake-disc 11, comprises an armature 12 having one face and its sides covered with a sintered material 13, the working face 14 of which can be applied against the disc by the action of a piston 15 forming part of an operating device (not shown).

During braking, and for a direction of rotation of the disc indicated in this case by the arrow F, the friction material forms a lateral abutment support of the plate against a stop member shown diagrammatically at 16.

In accordance with the invention, the armature 12 is provided at G with a certain inclination towards the rear with respect to the working face 14 of the plate, which inclination is preferably not very different from the angle whose cotangent is equal to the coefficient of friction between the friction material and the disc. However, instead of having at its rear end portion an edge such as that shown at D in FIG. 2, the end portion of the above-mentioned inclined part of the armature is in this case provided at HK with a surface substantially parallel to the surface of the friction material forming the abutment, which results in a relative reduction of the pressure to which this latter is subjected at this point during braking.

Due to the inclination G, the edge H is not subject to the relatively large forces that edge B is subjected to in the known arrangement of FIGURE 1. Therefore, the undesirable chiseling effect of the known arrangement is not present in the present invention.

Another effect of this arrangement in the zone of the plate forming an abutment is to force the friction material which is on the one hand pushed by the reaction of the stop 16 and on the other hand pressed between the brake-disc and its armature during braking, into progressive compression against the adjacent portion of this material located between the working face and the armature of the plate, which reinforces the resistance of the friction material in the zone considered.

Furthermore, the present shape of the plate lends itself to production by pressing or stamping, without machining.

On the other hand, the friction material may only come level with the rear end face of the armature as shown in the present drawings in the right-hand portion of FIG. 3, which already provides a large lateral working face for the plate, taking into account the present shape of the armature, but it may also partly enclose the armature on the side opposite to the working face of the plate, as shown in the left-hand portion of FIG. 3, at 13¹, thereby correspondingly increasing the abutment surface of the plate.

I claim:

1. In a disc-brake having a disc and a stop member located adjacent the working face of said disc, an improvement comprising an armature having a face portion parallel to said disc and a side portion integral with and extending downward from said face portion, at least a portion of said side portion being inclined at an angle to said face portion; and a friction material covering said face portion and side portion of said armature, which is adapted to respectively engage said working face of said disc and said stop member; said angle substantially corresponding to the angle whose cotangent is equal to the coefficient of friction between the contacting surfaces of said disc and friction material covering the face of portion of said armature.

2. The improvement of claim 1 wherein said friction material partly encloses said side portion.

3. The improvement of claim 1 wherein the end portion of said side portion has a surface substantially parallel to a plane perpendicular to said working face of said disc.

No references cited.

MILTON BUCHLER, *Primary Examiner.*

G. HALVOSA, *Assistant Examiner.*